(12) United States Patent
Moon

(10) Patent No.: US 6,229,695 B1
(45) Date of Patent: May 8, 2001

(54) PALM-SIZED COMPUTER WITH A FRAME TO HOLD DEVICE PLATES

(75) Inventor: Joung-Nam Moon, Seoul (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/283,236

(22) Filed: Apr. 1, 1999

(30) Foreign Application Priority Data

Apr. 3, 1998 (KR) .................................................. 98/11897

(51) Int. Cl.[7] ........................................................ G06F 1/16
(52) U.S. Cl. ...................... 361/683; 361/686; 312/223.2; 345/179; 345/905; 349/58
(58) Field of Search .................................... 345/178, 179, 345/156, 905; 361/681, 683, 686, 730; 250/372; 349/58, 65; 312/223.1, 223.3

(56) References Cited

U.S. PATENT DOCUMENTS

| | | | |
|---|---|---|---|
| 4,704,535 | * 11/1987 | Leber et al. ......................... | 250/372 |
| 5,329,427 | * 7/1994 | Hogdahl .............................. | 361/730 |
| 5,373,458 | 12/1994 | Bishay . | |
| 5,515,303 | 5/1996 | Cargin, Jr. et al. . | |
| 5,579,487 | * 11/1996 | Meyerson et al. ................... | 395/280 |
| 5,617,343 | 4/1997 | Danielson et al. . | |
| 5,757,681 | * 5/1998 | Suzuki et al. ................... | 364/705.03 |
| 5,815,343 | * 11/1998 | Johns et al. ......................... | 361/681 |
| 5,863,674 | 1/1999 | Yamanaka . | |
| 5,973,677 | * 10/1999 | Gibbons .............................. | 345/179 |

* cited by examiner

Primary Examiner—Leo P. Picard
Assistant Examiner—Lisa Lea-Edmonds
(74) Attorney, Agent, or Firm—Robert E. Bushnell, Esq.

(57) ABSTRACT

A palm-sized computer comprises a housing for encasing the structure of the palm-sized computer, a frame having a first and a second holding surface mounted in the inside of the housing, a liquid crystal display (LCD) panel held on the first holding surface of the frame to display information retrieved from the palm-sized computer, and a printed circuit board (PCB) held on the second holding surface of the frame to electrically connect various electronic devices. The PCB and LCD panel are supported by the frame in the housing.

19 Claims, 8 Drawing Sheets

10

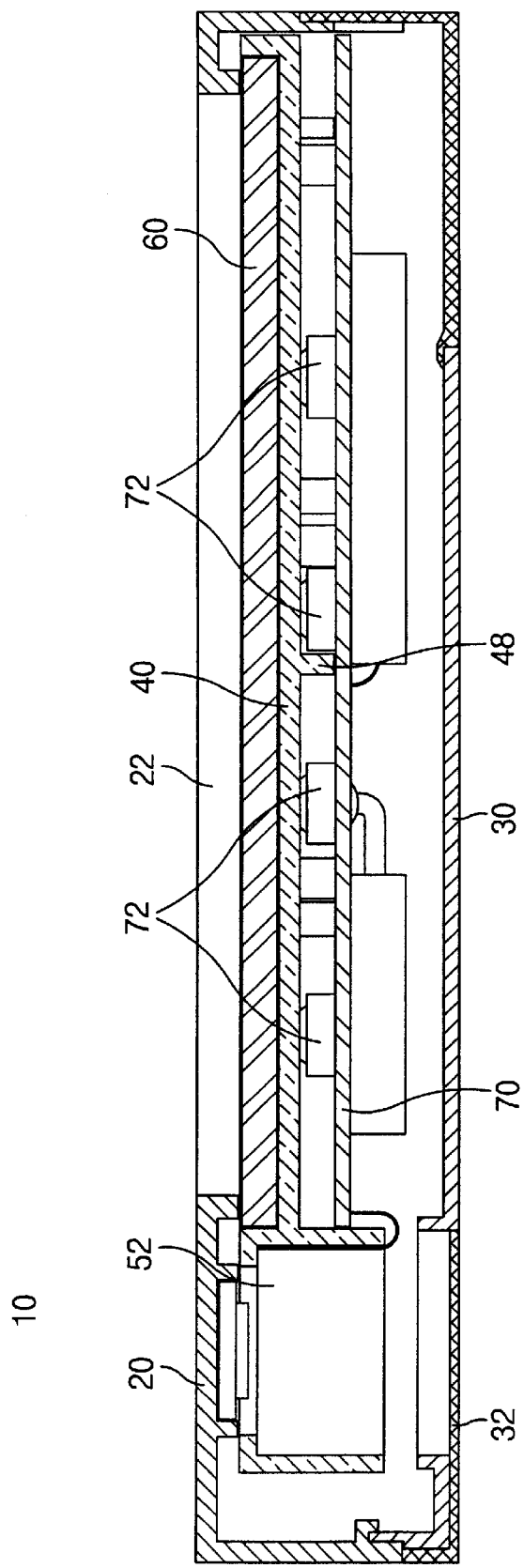

PALM-SIZED COMPUTER WITH A FRAME TO HOLD DEVICE PLATES

CLAIM OF PRIORITY

This application makes reference to, incorporates the same herein, and claims all benefits accruing under 35 U.S.C. §119 from an application for PALM-SIZED COMPUTER WITH A FRAME TO HOLD DEVICE PLATES earlier filed in the Korean Industrial Property Office on Apr. 3, 1998 and there duly assigned Serial No. 11897/1998.

BACKGROUND OF THE INVENTION

1. Field of the Invention

The present invention relates to electrical systems and devices, particularly a palm-sized computer, and more particularly a frame for holding device plates such as liquid crystal display panel, printed circuit board, etc. in the housing of a palm-sized computer.

2. Related Art

Personal computers are classified on the basis of size and portability. Personal computers that can be placed on top of a desk but are not very portable are called desktop computers. Portable computers are those personal computers that are light enough to be easily transported. Portable personal computers that are small enough to be set on the lap of a user are called laptop computers; notebook computers are approximately the size of a book. Portable personal computers that can be put in a pocket are called pocket or palm-sized computers. A notebook computer typically has a keyboard as its input unit, but a pocket or palm-sized computer usually employs a stylus as its input unit instead of a keyboard because the stylus enhances the portability and facilitates data input.

A conventional palm-sized computer 300 includes a top housing part, a bottom housing part, a frame, a liquid crystal display (LCD) panel, and a printed circuit board (PCB). The frame, LCD panel and PCB, hereinafter referred to as device plates, are mounted in the internal space between the assembled top and bottom housing parts. The device plates are fixedly attached to the bottom housing part by means of a plurality of screws, which are inserted through a plurality of corresponding holes formed in the device plates and fixed into a plurality of corresponding bosses formed on the bottom housing part. In addition, the top housing part has a battery case to receive a battery inserted through a battery door formed in the bottom housing part. The battery case includes electrical terminals connected with the electronic devices of the computer.

Such a conventional palm-sized computer suffers the drawback that the many screws required to fix the device plates cause a considerable increase in the size of the housing. That is, in order to fix the device plates by using the screws, there are required a plurality of corresponding bosses formed on the inside of the bottom housing part. This causes an overall size increase of the palm-sized computer. In addition, because the device plates are rigidly connected with the bottom housing by means many screws, an impact externally exerted to the housing is directly transmitted to the electronic devices, and thus may easily destroy them. Further, assembly of the conventional palm-sized computer is achieved through very complicated processing steps to assemble the device plates and battery terminals especially because the battery terminals are separately prepared to connect with the electronic devices by means of separate conductive lines. This increases the number of the steps of assembling the devices.

Additional examples of the structures of hand-held electronic devices are seen, for example, in the following U.S. patents. U.S. Pat. No. 5,373,458, to Bishay et al., entitled Enclosure For A Hand-Held Computer, describes a hand-held computer which has an accessory interface board connected to the housing by two screws. A printed circuit board is flexibly connected to the liquid crystal display. The printed circuit board is securely held between the top enclosure portion, that is, the housing, and the bottom enclosure portion. The liquid crystal display is allowed to "float" to prevent it from shock. An alternative embodiment which allows the printed circuit board to "float" is mentioned but not shown or described. As shown, the printed circuit board directly rests against the housing, and moreover this design requires a robust flexible connection between the PCB and the LCD.

U.S. Pat. No. 5,515,303, to Cargin Jr. et al., entitled Hand-Held Computerized Data Collection Terminal With Rechargeable Battery Pack Sensor And Battery Power Conservation, describes a device in which a circuit board is connected to the display though connector elements through a conductive pad. The circuit board and the display are screwed to the housing, and thus have the problem of shock transmission through the housing. The battery case is formed in the housing and the electrical connection to the printed circuit board is through a battery supply connector with a plurality of receptors mating with the host board to provide battery power to the terminal.

U.S. Pat. No. 5,617,343, to Danielson et al., entitled Portable Work Station And Data Collection Terminal Including Switchable Multi Purpose Touch Screen Display, describes a handheld data terminal. The device has a circuit board attached to the housing by several screws, which can lead to the problem of impact transmission to the circuit board.

Also of note is U.S. Pat. No. 5,863,674, to Yamanaka, entitled Battery Terminals For a Miniature Electronic Apparatus And Structure For Holding The Same. This patent describes an arrangement of battery terminals which mount directly to a circuit board, and which engage grooves in the battery casing to give the battery casing arrangement.

As noted above, the palm-sized computers of the conventional art generally require numerous screws and bosses in the housing, have a rigid direct connection between the device plates and the housing, and require separate wiring from the battery to the printed circuit board.

SUMMARY OF THE INVENTION

It is therefore an object of the invention to provide an improved palm-sized computer.

It is a further object of the invention to provide a palm-sized computer of smaller size.

It is a yet further object of the invention to provide a palm-sized computer with a reduced housing size.

It is a still further object of the invention to provide a palm-sized computer with improved impact-resistance of the device plates.

It is a still yet further object of the invention to provide a palm-sized computer which can be assembled in fewer and less complicated steps.

It is another object of the invention to provide a palm-sized computer in which the process of mounting the device plates in the housing is simplified.

According to an embodiment of the present invention, a palm-sized computer comprises a housing for encasing the structure of the palm-sized computer, a frame having a first and a second holding surface mounted in the inside of the housing, an LCD panel held on the first holding surface of the frame to display information retrieved from the palm-sized computer, a PCB held on the second holding surface of the frame to electrically connect various electronic devices, whereby the PCB and LCD panel are supported by the frame in the housing.

Preferably, the frame includes a plurality of support ribs protruding from the edges of the frame to support the LCD panel and PCB. The PCB is held on the second holding surface with a predetermined gap therebetween. A plurality of switches are arranged on the PCB to switch the computer to various functions, and a plurality of buttons mounted in the housing to correspond with the switches, the buttons having surfaces exposed outwardly. A plurality of mediums are integrally formed with the frame so as to be respectively interposed between the switches and buttons. This causes the pressing of the buttons to be transferred via the mediums to the switches. A battery case is integrally formed with the frame to mount a battery. The PCB further includes battery terminals to be associated with the battery case when attaching the PCB to the frame. The frame is fixedly attached to the inside of the housing by means of a screw inserted into a boss formed inside the housing. A stylus is employed as the data input unit in stead of a keyboard. An opening is formed in one side of the housing, and a stylus support formed in the frame to face the opening, whereby the stylus is stored into or removed from the stylus support via the opening.

Thus, a single screw is used to attach the device panels on the frame, which is mounted inside the housing of the computer with spaces between the first and second holding surfaces of the frame and the inside of the housing, so as to prevent an externally exerted impact from being directly transferred the electronic devices. Of course, such use of a single screw also reduces the internal space of the housing required for mounting the device plates. In addition, the battery terminals are automatically connected with the battery case when mounting the PCB on the frame, simplifying the assembly of the computer.

The present invention will now described more specifically with reference to the drawings attached only by way of examples.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 8 is a cross sectional view taken along line VIII—VIII of FIG. 6.

DETAILED DESCRIPTION OF THE PREFERRED EMBODIMENTS

Figure 1:
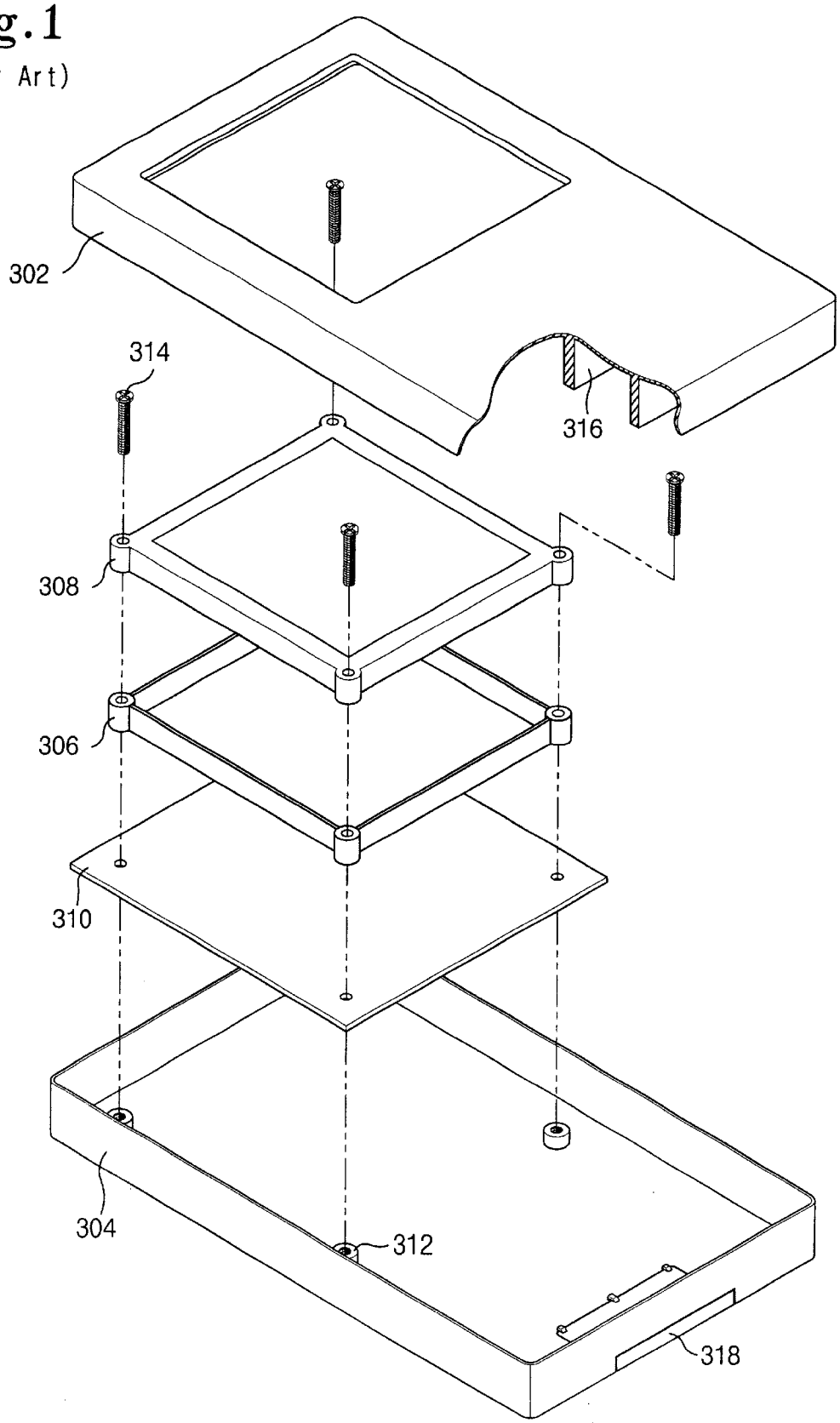
FIG. 1 is an exploded perspective view for illustrating the assembly of a conventional palm-sized computer.

Turning now to the drawings, FIG. 1 illustrates the conventional palm-sized computer discussed above. The conventional palm-sized computer 300 includes a top housing part 302, bottom housing part 304, frame 306, LCD panel 308, and printed circuit board (PCB) 310. The frame, LCD panel and PCB (the device plates) are mounted in the internal space between the assembled top and bottom housing parts 302 and 304. The device plates 306, 308, 310 are fixedly attached to the bottom housing part 304 by means of a plurality of screws 314, which are inserted through a plurality of corresponding holes formed in the device plates fixed into a plurality of corresponding bosses formed on the bottom housing part 304. In addition, the top housing part 302 has a battery case 316 to receive a battery (not shown) inserted through a battery door 318 formed in the bottom housing part 318. The battery case 316 includes electrical terminals (not shown) connected with the electronic devices of the computer.

Such a conventional palm-sized computer suffers the drawback that the many screws required to fix the device plates cause a considerable increase of the size of the housing. This is because in order to fix the device plates 306, 308, 310 by using the screws 314, there are required a plurality of corresponding bosses 312 formed on the inside of the bottom housing part 304. The presence of the bosses causes the overall size increase of the palm-sized computer. Moreover, because the device plates 306, 308, 310 are rigidly connected with the bottom housing 304 by means of many screws, an impact externally exerted to the housing is directly transmitted to the electronic devices, and thus may easily destroy them.

The present invention will now be described with reference to the drawings. Throughout the attached drawings, the same reference numerals are used to represent corresponding parts. Referring to FIGS. 2 to 6, a palm-sized computer 10 has a top housing part 20, a bottom housing part 30, a frame 40, an LCD panel 60, and a PCB 70. The device plates 40, 60, 70 are mounted in the internal space formed by the top and bottom housing parts 20 and 30. The LCD panel 60 and PCB 70 are attached to the frame 40 so that they are not directly supported by the top and bottom housing part 20 and 30. This prevents an impact externally exerted to the housing 20, 30 from being directly transmitted to the LCD 60 and PCB 70. The LCD is electrically connected with the PCB as is well known. The frame 40 is connected to the top housing 20 by using a single screw 76, which passes through a rib 58 formed on the frame 40 fixed into a boss 24 formed on the top housing part 20. Of course, the frame 40 may be connected to the top or bottom housing part 20 or 30 by various means. Such use of a single screw to mount the frame in the housing simplifies the assembly of the computer as well as reduces its size.

The frame 40 has a first and a second holding surface 42 and 44 to respectively hold the LCD panel 60 and the PCB 70. The LCD panel 60 is exposed through an opening 22 formed in the top housing part 20 to the outside. The LCD panel and PCB may be attached to the frame 40 by various means, and in the present embodiment by a plurality of support ribs 46 formed in the edges of the frame 40. In this way, several device plates may be laid over the frame, which will be readily achieved by those skilled in the art. The PCB 70 may be held by the second holding surface 44 of the frame with a given space therebetween, which is especially effective in the case of the PCB having electronic circuits formed on both sides. In the present embodiment, a plurality of spacing ribs 48 are formed on the second holding surface 44.

The frame 40 has a battery case 52 integrally formed thereon to mount a battery (not shown). The battery may be attached to or detached from the battery case 52 through a door 32 formed in the bottom housing 30. In addition, a speaker mount 28 is prepared in the part of the inside of the top housing part 20 where the battery case 52 is positioned when the frame is connected to the top housing part 20, so that a speaker may be readily attached to or detached from the speaker mount 28 through the door 32 without disassembling the computer 10. This improves the efficiency of using the internal space of the housing. The PCB 70 is provided with battery terminals 74 associated with the battery case 52 when it is mounted on the frame 40. This makes it unnecessary to use separate conductive lines to connect the battery terminals with the electronic circuits, thus simplifying the assembly of the computer.

A plurality of switches 72 are arranged on the PCB 70 for switching the computer to various functions, and a plurality of buttons 26 mounted in the top housing part 20 to correspond with the switches 72. The buttons have surfaces exposed outwardly. In this case, the displacement range of the buttons 26 should be to effectively operate the switches 72. In order to secure the effective operation of the switches from the contrary, a plurality of mediums 50 are integrally formed with the frame 40 so as to be respectively interposed between the switches 72 and buttons 26. This causes the pressing of the buttons to be efficiently transferred via the mediums to the switches. A stylus 80 is employed as the data input unit instead of a keyboard. If the stylus is a conductive stylus, it is electrically connected to the computer via a conductive cord. In the present embodiment, the stylus is the type of screen write or touch screen technology. The stylus may be stored into the housing of the computer 10. To this end, a stylus support 54 is formed in the frame 40 to have a support surface accommodating the periphery of the stylus 80. It also has a hook 56 resiliently formed so as to hold a groove 82 formed on the stylus 80. The hook 56 serves to prevent the stylus 80 from being inadvertently detached from the stylus support 54. The hook 56 is formed at a free end of a strip of which the other end is connected to the stylus support 54. The top and bottom housing parts 20 and 30 are respectively provided with a first and a second notch 29 and 34 so as to form an opening leading to the stylus support 54 when they are connected. Thus, the stylus 80 is stored into or removed from the stylus support 54 via the opening consisting of the first and second notches 29 and 34.

Figure 2:
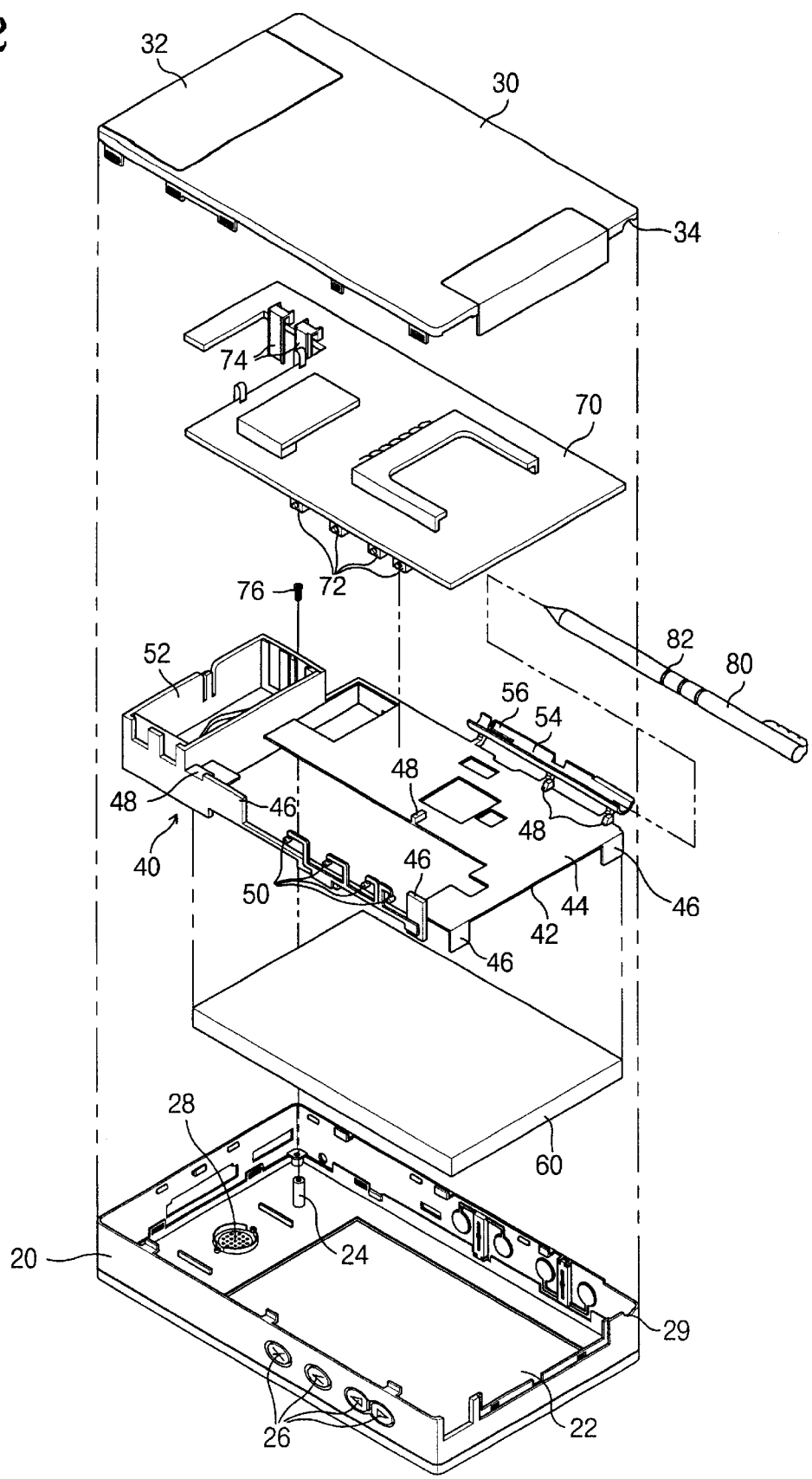
FIG. 2 is an exploded perspective view for illustrating the assembly of the inventive palm-sized computer.
Figure 3:
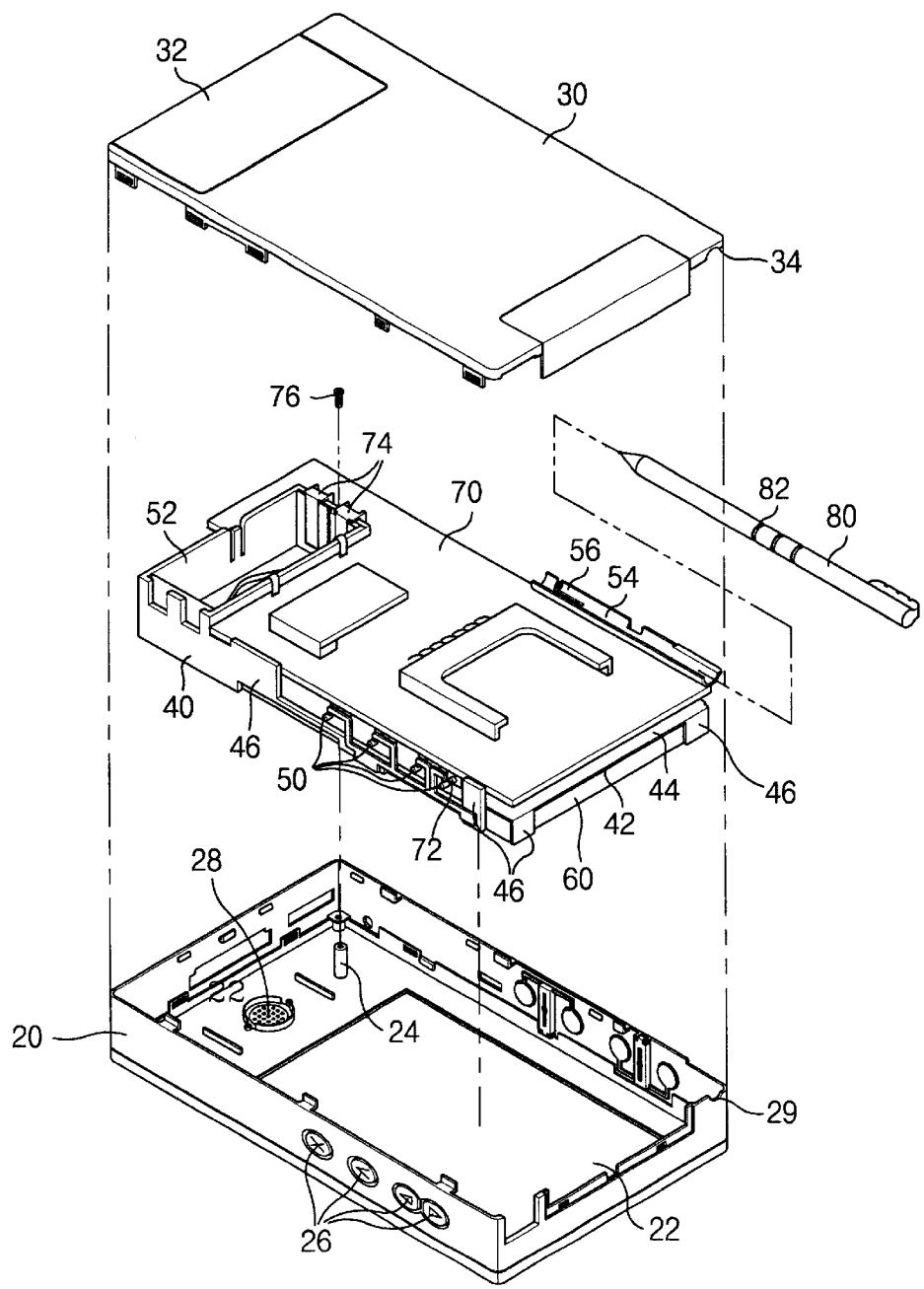
FIG. 3 is a view similar to FIG. 2 but with the LCD and PCB attached to the frame according to the present invention.
Figure 4:
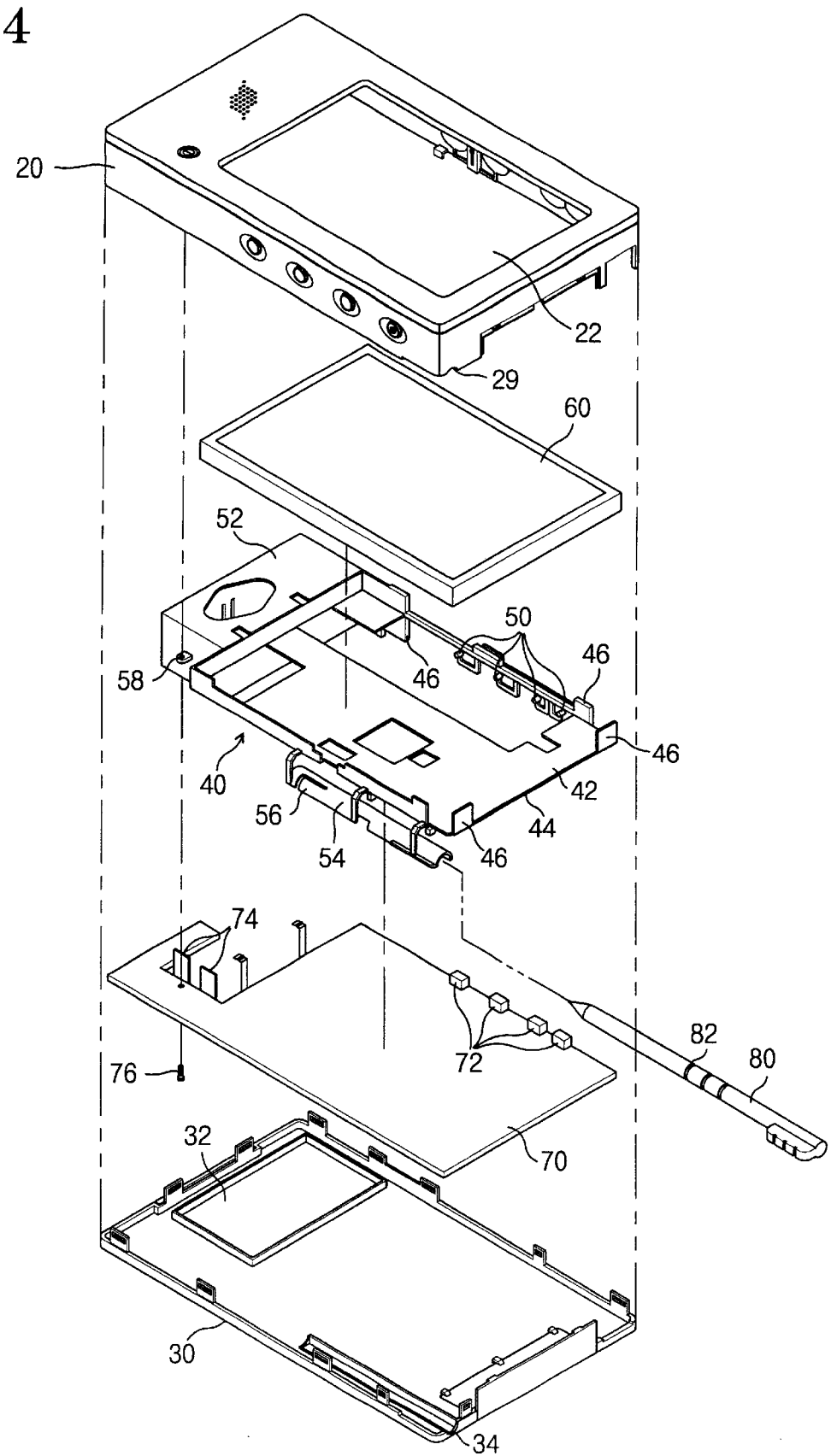
FIG. 4 is a view similar to FIG. 2 but showing the other sides of the device plates.
Figure 5:
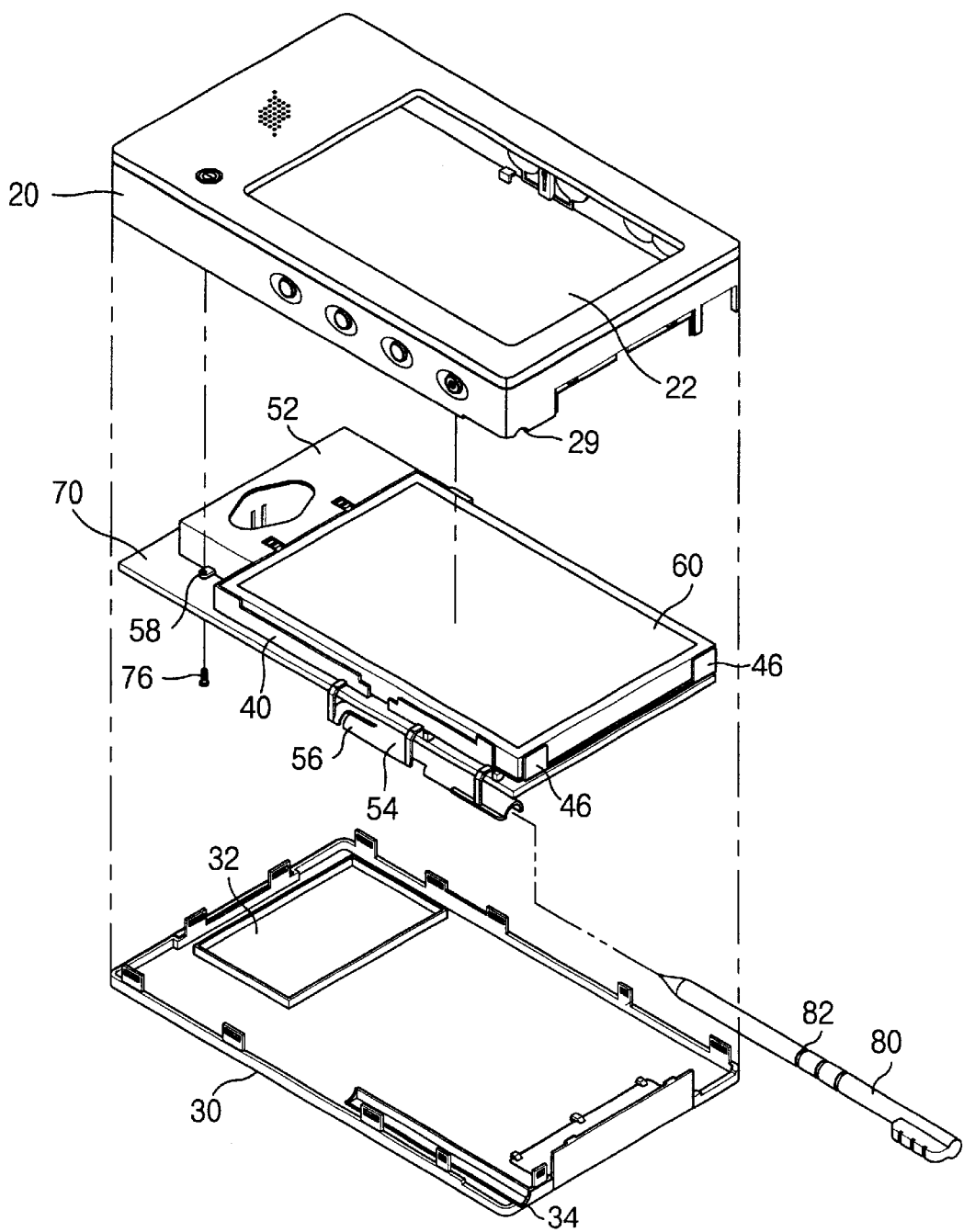
FIG. 5 is a view similar to FIG. 4 but with the LCD and PCB attached to the frame.
Figure 6:
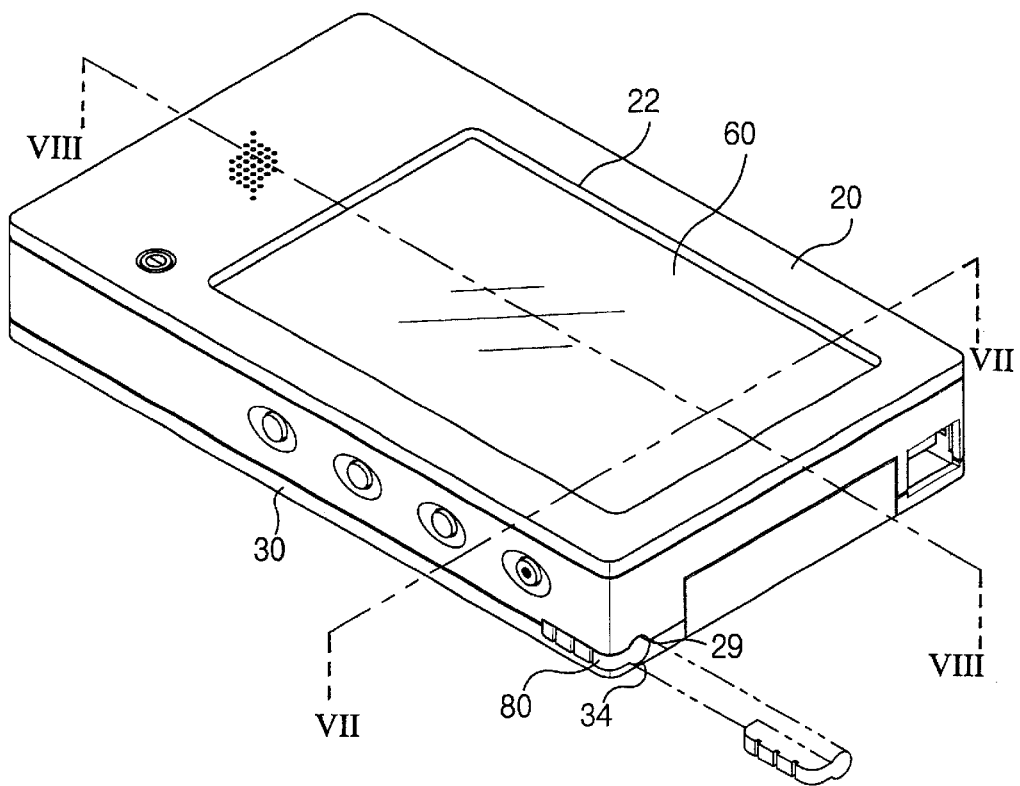
FIG. 6 is a perspective view for illustrating the complete assemblage of a palm-sized computer as shown in FIG. 5.
Figure 7:
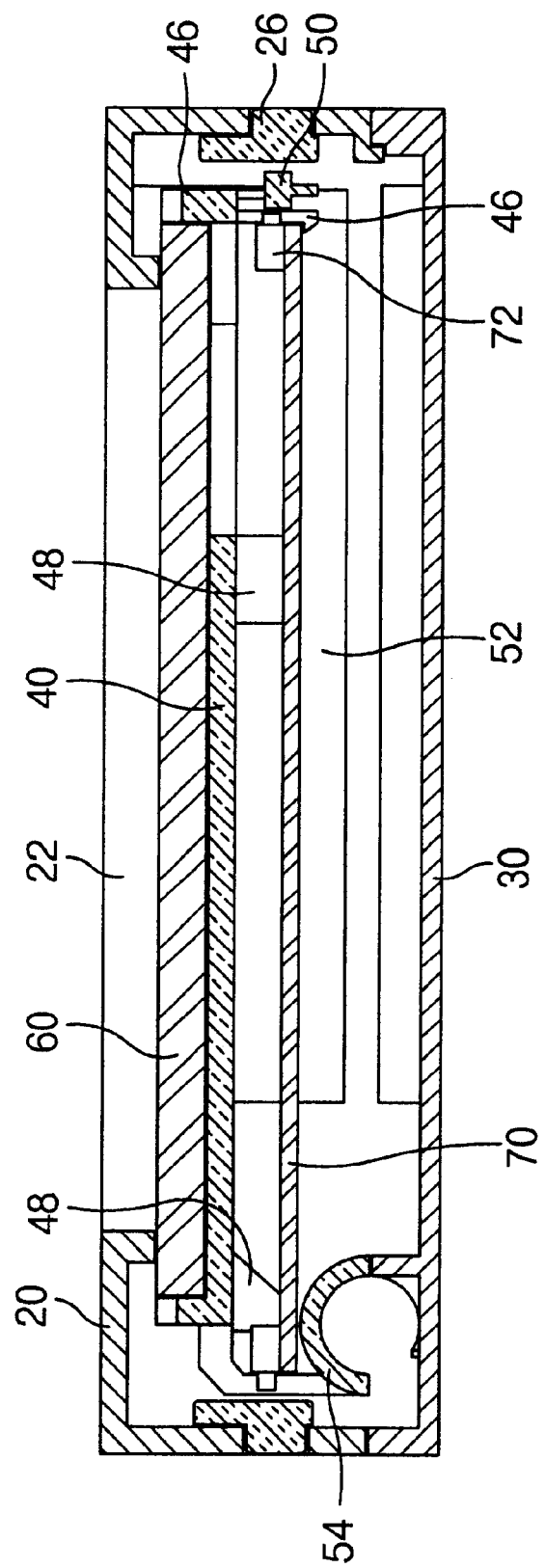
FIG. 7 is a cross sectional view taken along line VII—VII of FIG. 6.

Referring to FIGS. 7 and 8, the LCD panel 60 and PCB 70 are mounted on the frame 40 in the housing of the computer 10 so that they are not directly attached to the top and bottom housing parts 20 and 30. The frame 40 is connected to the top housing part 20 by means of a single screw 76, as shown in FIG. 2. A resilient insulating layer (not shown) may be interposed between the LCD panel and the top housing part 20. The frame 40 is integrally formed with the battery case 52, of which the battery terminals 74 are formed in the PCB 70, as shown in FIG. 2. The battery terminals 74 are associated with the battery case when the PCB 70 is mounted on the frame 40.

While the present invention has been described in connection with specific embodiments accompanied by the attached drawings, it will be readily appreciated by those skilled in the art that various changes and modifications may be made thereto while remaining within the spirit and scope of the present invention.

What is claimed is:

1. A palm-sized computer, comprising:
   a housing for encasing the components of the palm-sized computer, said housing comprising a top housing part and a bottom housing part;
   a frame mounted to the inside of the housing, said frame comprising:
      a first holding surface on one side of the frame, and
      a second holding surface on the opposite side of the frame;
   a liquid crystal display panel for displaying information, said liquid crystal display held on said first holding surface; and
   a printed circuit board for electrically connecting components of the computer, said printed circuit board held on said second holding surface.

2. The palm-sized computer of claim 1, further comprising:
   said frame being mounted to said top housing part.

3. The palm-sized computer of claim 2, further comprising:
   a boss on said top housing part; and
   a screw mounting the frame to the boss on the top housing part.

4. The palm-sized computer of claim 3, there being only one boss on said top housing part.

5. The palm-sized computer of claim 1, further comprising:
   said frame being mounted to sad bottom housing part.

6. The palm-sized computer of claim 5, further comprising:
   a boss on said bottom housing part; and
   a screw mounting the frame to the boss on the bottom housing part.

7. The palm-sized computer of claim 6, there being only one boss on said bottom housing part.

8. The palm-sized computer of claim 1, further comprising:
   support ribs protruding perpendicularly from the edges of said frame for supporting said liquid crystal display panel on the first holding surface.

9. The palm-sized computer of claim 1, further comprising:
   support ribs protruding perpendicularly from the edges of said frame for supporting said printed circuit board on the second holding surface.

10. The palm-sized computer of claim 1, further comprising:
    support ribs protruding perpendicularly from the edges of said frame for supporting said liquid crystal display panel on the first holding surface and for supporting said printed circuit board on the second holding surface.

11. The palm-sized computer of claim 1, further comprising:
    a plurality of spacing ribs formed on the second holding surface for spacing the printed circuit board from the second holding surface.

12. The palm-sized computer of claim 1, further comprising:
    a button mounted in a side of the housing;

a switch for switching the function of the computer, said switch arranged along an edge of the printed circuit board; and a medium integrally formed on an edge of the frame, for transmitting the pressure of the button to the switch when the button is pressed.

13. The palm-sized computer of claim 1, further comprising:

a battery case formed in the frame.

14. The palm-sized computer of claim 13, further comprising:

battery terminals formed on said printed circuit board and extending inside said battery case.

15. The palm-sized computer of claim 13, further comprising:

a speaker mount on the inside of said top housing part, aligned with the battery case;

a door in the bottom housing part, aligned with the battery case and the frame, for gaining access to the battery case and the speaker mount.

16. The palm-sized computer of claim 1, further comprising:

a stylus for inputting data.

17. The palm-sized computer of claim 14, further comprising:

an opening along an edge of the housing and a stylus support formed in said frame facing the opening, for providing storage for the stylus.

18. The palm-sized computer of claim 17, said opening further comprising:

a first notch formed along an edge of the top housing and a second notch formed along an edge of the second housing facing said first notch.

19. The palm-sized computer of claim 1, further comprising:

a resilient layer between the liquid crystal display panel and the top housing part, for providing impact resistance for the liquid crystal display.

\* \* \* \* \*